July 23, 1968  M. I. MINDELL ETAL  3,393,960
AUTOMATIC FILM LOADING MEANS

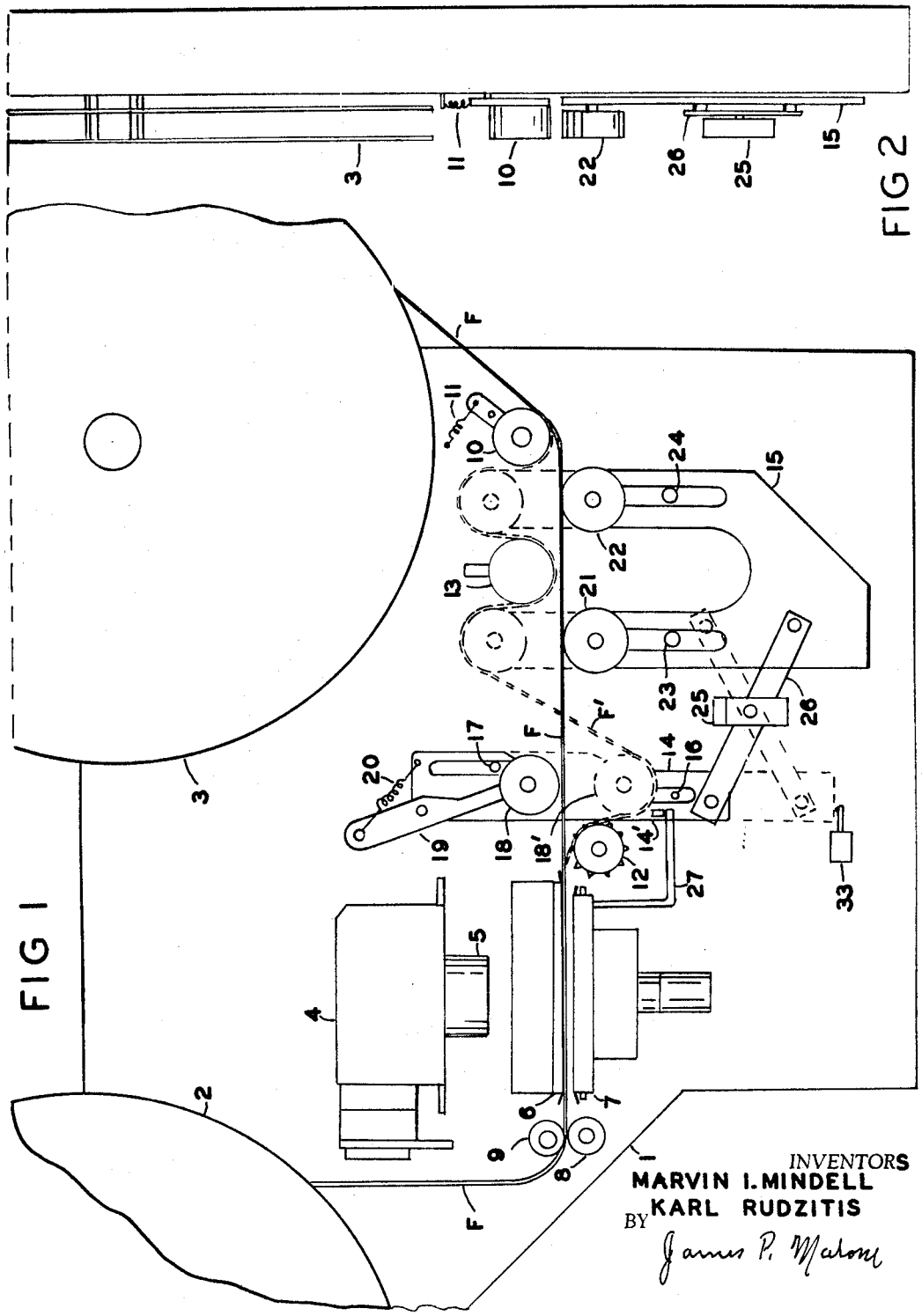

Filed Aug. 25, 1965  2 Sheets-Sheet 2

INVENTORS
MARVIN I. MINDELL
KARL RUDZITIS
James P. Malone

United States Patent Office 3,393,960
Patented July 23, 1968

3,393,960
AUTOMATIC FILM LOADING MEANS
Marvin I. Mindell, Great Neck, and Karl Rudzitis, West Babylon, N.Y., assignors to Viewlex, Inc., Holbrook, N.Y.
Filed Aug. 25, 1965, Ser. No. 482,505
3 Claims. (Cl. 352—29)

ABSTRACT OF THE DISCLOSURE

The present invention generally comprises, in a projector having a conventional takeup reel and supply reel, pivotally mounted film gate and fixedly mounted guide rollers which pass the film in a straight line through the film gate and past the sound pickup. The film is merely held in a straight line and dropped into the slot formed by the film gate and the fixedly mounted guide rollers. Slidably mounted guide rollers are then moved into operative position by means of a control handle. A first guide roller engages the film around the guide sprockets and the other two guide rollers wrap the film around the sound pickup. The drive sprocket automatically engages the film.

---

This invention relates to automatic film loading means for projectors and more particularly to means for loading motion picture type film without the necessity of threading it through a plurality of sprockets.

Conventional projector apparatus for motion picture film generally requires a fairly complicated threading operation in order to load the film through the film gate and around various sprockets in order to drive the film. This procedure is rather time consuming and is liable to cause malfunction or damage to the film if it is not properly performed. The present invention eliminates all threading of any type. The film is merely dropped into a slot formed by the film gate and a single knob is moved in order to engage the film drive sprocket and wrap the film around the sound pickup.

The present invention generally comprises, in a projector of the type having a conventional takeup reel and supply reel, a pivotally mounted film gate and fixedly mounted guide rollers which pass the film in a straight line through the film gate and past the sound pickup. The film is merely held in a straight line and dropped into the slot formed by the film gate and the fixedly mounted guide rollers. Slidably mounted guide rollers are then moved into operative position by means of a control handle and a first guide roller engages the film around the guide sprockets and the other two guide rollers wrap the film around the sound pickup. The drive sprocket automatically engages the film.

Accordingly, a principal object of the invention is to provide new and improved means for loading motion picture film into a projector without the necessity of threading.

Another object of the invention is to provide new and improved means for the automatic threading of motion picture film.

Another object of the invention is to provide new and improved motion picture moving apparatus having a first position for fast speed and rewind and having a second operative position for normal viewing.

Another object of the invention is to provide new and improved means for loading motion picture film in a projector of the type having a supply and takeup reels, an optical axis and a sound pickup comprising, a movably mounted film gate mounted on said optical axis, means to guide said film in a straight line through said film gate and past said sound pickup, a driven sprocket placed off said straight line sufficiently so that the said sprocket does not engage the film when said film is in said straight line, a first slidable member, a first guide roller mounted on said first slidable member, said first guide roller being adapted to wrap said film around said drive sprocket when said slidable member is moved to operative position, a second forked slidable member having two extensions, a pair of guide rollers one mounted on each of said extensions, second and third rollers being adapted to wrap said film around said sound pickup, and control means to actuate said first and second slidable members simultaneously, whereby when said control member is moved to operative position said film is wrapped around said sprocket and said sound pickup.

These and other objects of the invention will be apparent from the following specification and drawings of which:

FIGURE 1 is a top view of the embodiment of the invention.

FIGURE 2 is a side view of the embodiment of FIGURE 1.

Figure 5:
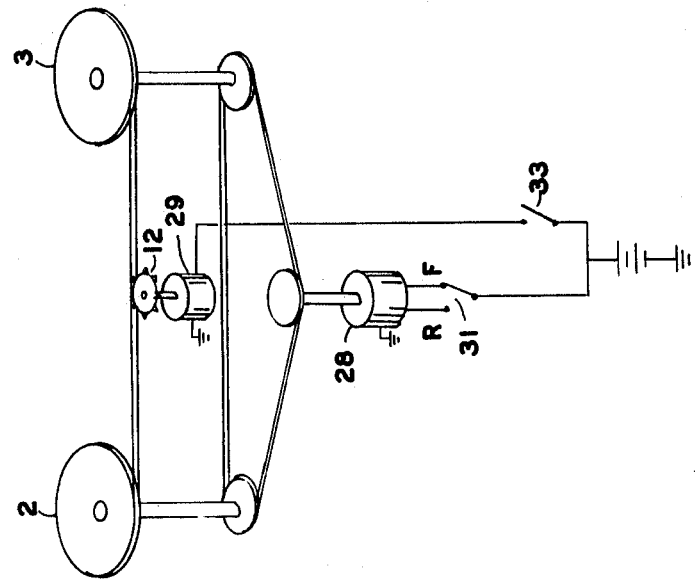
FIGURE 5 is a schematic electrical circuit diagram.
Figure 3:
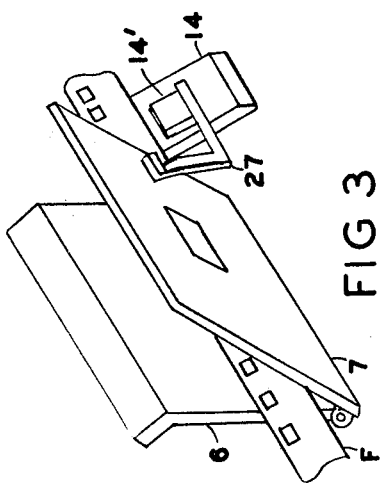
FIGURES 3 and 4 are detail views illustrating the operation of the pivotally mounted film gate.

Referring to the figures, FIGURE 1 shows a conventional film viewer and projector 1 having a conventional supply reel 2 and a film takeup reel 3 which are mounted in a horizontal plane in this embodiment. However, the operation would apply equally well to the conventional projector having the reels in a vertical plane. The projector also has a conventional optical system including a lamp 4 and a projection lens 5.

The system outlined will only be applicable where the film moves continuously through the gate as is the case in rotating or oscillating mirror or prism devices. It does not apply in devices utilizing an intermittent drive such as a claw since these systems require a slack loop, provision for which cannot be made with this device.

The film F is passed in through the optical axis through a film gate which comprises a fixedly mounted member 6 and a pivotally mounted member 7 and between a pair of permanently mounted guide rollers 8 and 9 guiding the film from the supply reel into the film gate. A pivotally mounted guide roller 10, which is spring loaded by the spring 11, maintains the film in a straight line through the film gate and past the sound pickup 13 onto the takeup reel, when the film gate apparatus described hereafter is in the open or non-operative position.

A driven sprocket 12 is mounted just after the film gate in the direction of film travel and sufficiently displaced from the straight line previously mentioned and shown in full line position of film F, so that the sprockets do not engage the film when the film is placed in a straight line as previously described. When the film is in this position, it is therefore, rapidly moved in either a forward or in a rewind mode of operation, since it does not engage any sprockets whatsoever. This mode of operation is useful in film editing.

The projector also has a conventional sound pickup 13 which is fixedly mounted on the case.

In order to engage the film with the drive sprocket around the sound pickup in the operative mode of operation, as shown by the dotted line F′, the present invention provides a first slidably mounted member 14, and a second slidably mounted member 15. The member 14 is slidably mounted on top of case 1 by means of guide pins 16 and 17 which engage corresponding slots in member 14. A guide roller 18 is pivotally mounted on the end of member 14 by means of the lever 19, which is spring loaded by spring 20. When the slidable member 14 is moved to the operative position illustrated by the dotted lines, then the guide roller 18 assumes the position shown by the dotted line 18' so that the roller 18 wraps the film F' around the drive sprocket 12.

A second slidable mounted member 15 is provided to wrap the film around the sound pickup 13. This member comprises a forked member 15 having two extensions. On the ends of the extensions are mounted guide rollers 21 and 22. The slidable member 15 is adapted to be slidably held by means of guide pins 23 and 24 which engage corresponding slots in member 15.

When the member 15 is pushed into the operative position shown by the dotted lines, then the guide rollers 21 and 22 assume the positions shown by the dotted lines and wrap the film around the sound pickup 13. A control handle 25 is pivotally mounted on the case 1 and is connected to a link member 26 which is pivotally connected to the slidable members 14 and 15, so that when the control handle 25 is turned counter-clockwise in FIGURE 1, then the slidable members 14 and 15 are moved into operative position, wrapping the film around the drive sprockets and the sound pickup 13.

Figure 4:
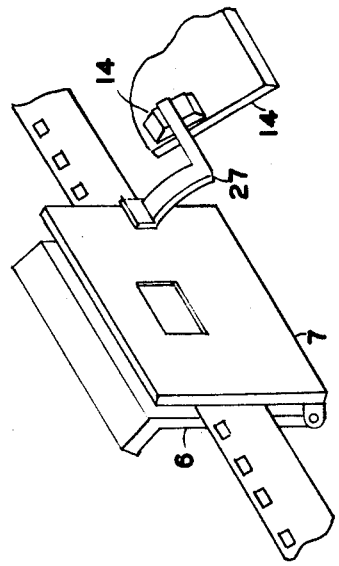

When the slidable member 14 moves into operative position the cam 14' mounted thereon engages the arm 27 connected to the film gate so that the film gate is closed, as illustrated in FIGURES 4 and 5.

If desired, a microswitch 33 may be mounted on the case so as to be actuated by the member 14 when it is moved into operative position. The microswitch 33 may be connected to operate a motor 29 which operates film drive 12 as illustrated in FIGURE 5.

FIGURE 5 also illustrates means for providing the first mentioned mode of operation namely fast speed forward or rewind by means of switch 31 connected to the windings of reversible motor 28. Motor 28 may be a single speed type which can operate under what is called "high slip" conditions. In this case, the motor always tends to drive at a high speed but will not be damaged if the rotor is restricted from turning by the film which is held back by the film which is being driven slowly by the sprocket wheel. When the sprocket wheel does not engage the film, the motor 28 then drives the film reels forward or reversed at high speed since nothing restricts film motion. Two motors directly connected to each reel may be substituted for the single reversible motor, and its associated belt drive.

Many modifications may be made by those who desire to practice the invention without departing from the scope thereof which is defined by the following claims.

We claim:
1. Means for loading motion picture film in a projector of the type having supply and takeup reels, an optical axis and a sound pickup comprising;
  a movably mounted film gate mounted on said optical axis,
  means to guide said film in a straight line through said film gate and past said sound pickup,
  a driven sprocket placed off said straight line sufficiently so that the said sprocket does not engage the film when said film is in said straight line,
  a first slidable member,
  a first guide roller mounted on said first slidable member,
  said first guide roller being adapted to wrap said film around said drive sprocket when said slidable member is moved to operative position,
  a second forked slidable member having two extensions,
  a pair of guide rollers one mounted on each of said extensions,
  second and third rollers being adapted to wrap said film around said sound pickup,
  and control means to actuate said first and second slidable members simultaneously,
  whereby when said control member is moved to operative position said film is wrapped around said sprocket and said sound pickup,
  said film gate being pivotally mounted and connected to said slidable members so that when said slidable members are moved to operative position, said film gate is closed.

2. Apparatus as in claim 1 wherein said film gate is adapted to be operated by one of said slidable members.

3. Apparatus as in claim 1 wherein said supply and takeup reels are motor driven and having means to control said motors at fast forward and reverse speed when said slidable members and film gate are in open position, said control means being actuated into a second normal viewing speed when said slidable members are moved to operating position.

References Cited

UNITED STATES PATENTS

| | | | |
|---|---|---|---|
| 2,227,259 | 12/1940 | Hokanson | 352—123 |
| 2,998,748 | 9/1961 | Dessilani | 352—123 |

JULIA E. COINER, *Primary Examiner.*